No. 684,939. Patented Oct. 22, 1901.
R. KOSCH.
DRIVING GEAR FOR CYCLES.
(Application filed Nov. 20, 1900.)

(No Model.) 2 Sheets—Sheet 1.

WITNESSES:
Ella L. Giles
Clara D. Frohback

INVENTOR
Rudolph Kosch
BY
Richard R.
ATTORNEYS

No. 684,939. Patented Oct. 22, 1901.
R. KOSCH.
DRIVING GEAR FOR CYCLES.
(Application filed Nov. 20, 1900.)

(No Model.) 2 Sheets—Sheet 2.

WITNESSES
Ella L. Giles
Clara N. Frohlach

INVENTOR
Rudolph Kosch
BY
Richardson
ATTORNEYS

UNITED STATES PATENT OFFICE.

RUDOLPH KOSCH, OF BUDAPEST, AUSTRIA-HUNGARY.

DRIVING-GEAR FOR CYCLES.

SPECIFICATION forming part of Letters Patent No. 684,939, dated October 22, 1901.

Application filed November 20, 1900. Serial No. 37,188. (No model.)

*To all whom it may concern:*

Be it known that I, RUDOLPH KOSCH, engineer, a subject of His Majesty the Emperor of Austria-Hungary, residing at Danubius Shipyard, Budapest, Austria-Hungary, have invented certain new and useful Improvements in and Relating to the Driving-Gear of Cycles; and I do hereby declare the following to be a full, clear, and exact description of the invention, such as will enable others skilled in the art to which it appertains to make and use the same.

This invention relates to that class or type of cycle driving-gear which is actuated by an up and down in lieu of by a rotary movement of the feet, the cranks oscillating through arcs of a circle, and has for its object, while preserving all the advantages of this type of gear, (such as absence of dead-centers, better application of power, and increased leverage,) to obviate the drawbacks of former arrangements due to complicated and erroneous construction and to provide a gear which will be both efficient and practical.

I shall hereinafter describe my invention as applied to a bicycle for a single rider; but it may equally well be applied to tandems, triplets, tricycles, and other varieties of cycles.

According to my invention the driving-wheel of the bicycle is driven from a rotating crank shaft or axle by a pitch-chain and sprocket-wheels or other recognized and suitable means—such as bevel-gear, for example; but the cranks, in lieu of being keyed or rigidly secured to the crank-axle, are mounted freely thereon and rotate the same when oscillated through the medium of clutch devices, so arranged that the crank-axle is revolved by alternate downstrokes of the feet on the pedals, means being provided whereby one crank is lifted as the other is depressed. Since the said clutch devices only act to turn the crank-axle in one direction—*i. e.*, forward—the said axle can of course overrun the cranks, so that the advantages of free wheeling are presented. I find the arrangement of ratchet-clutches hereinafter described to be satisfactory and convenient; but roller or other suitable clutch devices may be substituted if preferred.

I will now fully describe cycle driving-gear embodying my invention, having reference to the annexed drawings, in which—

Figure 1:
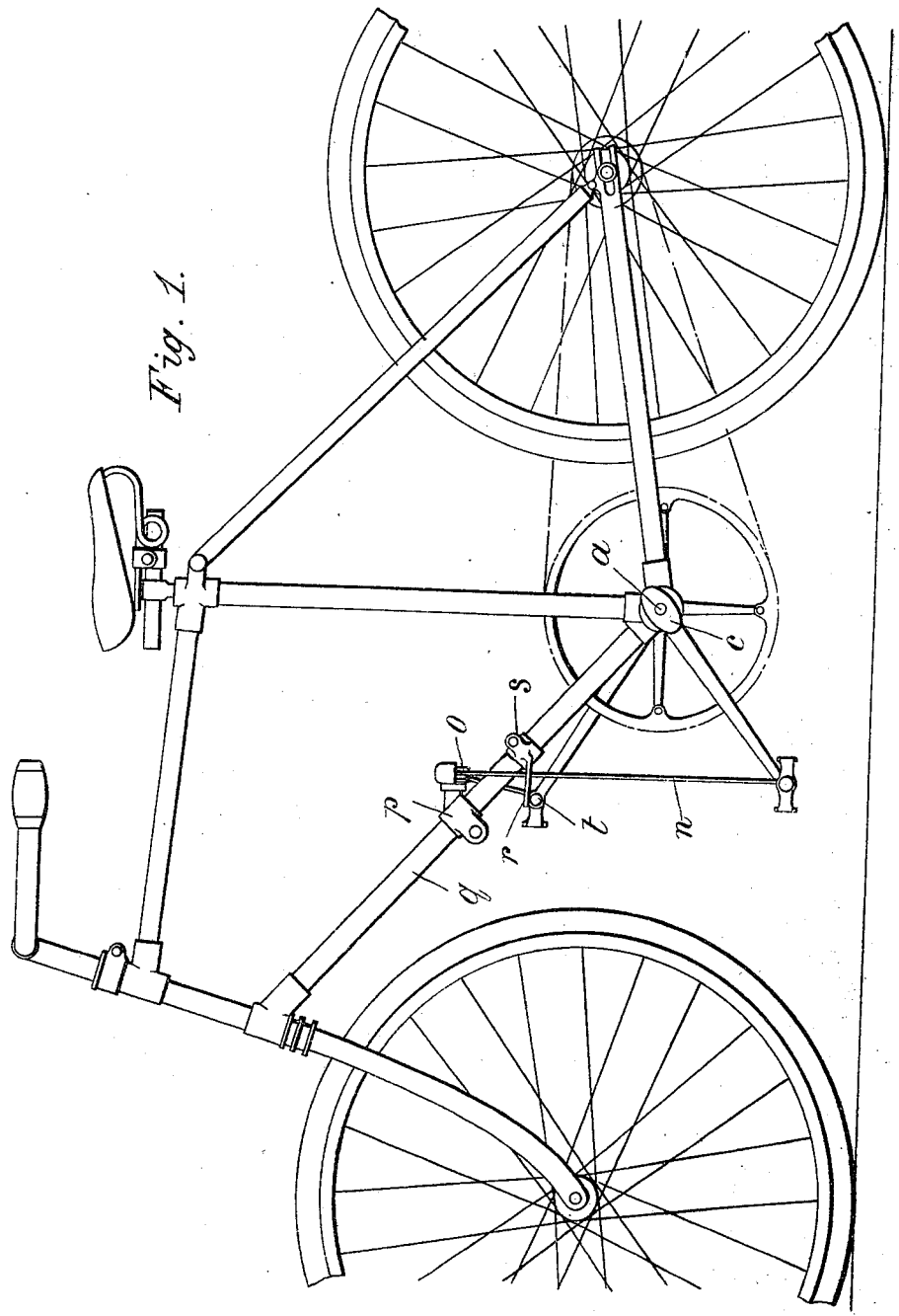
Figure 2:
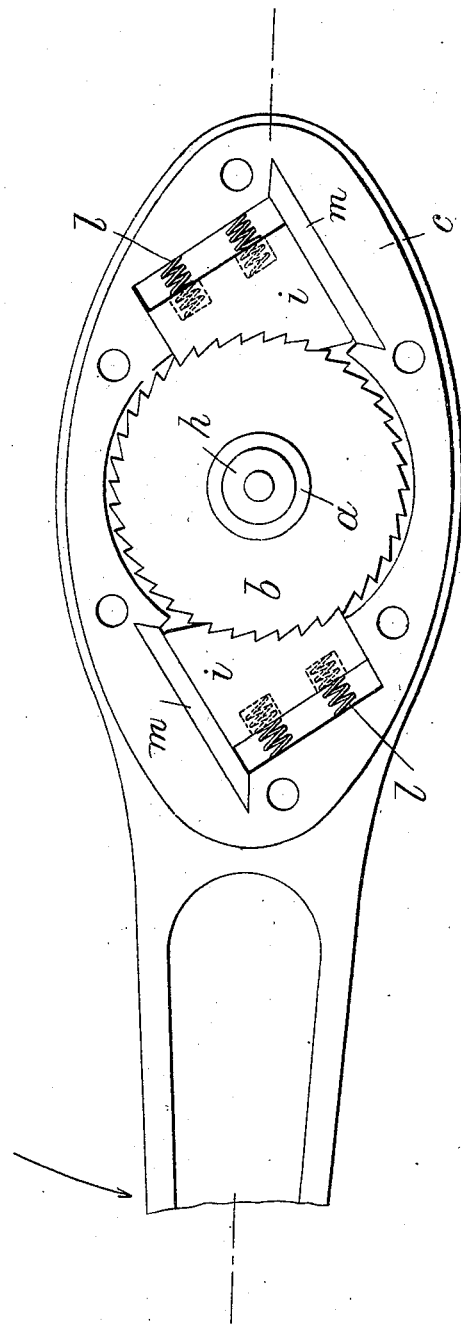
Figure 3:
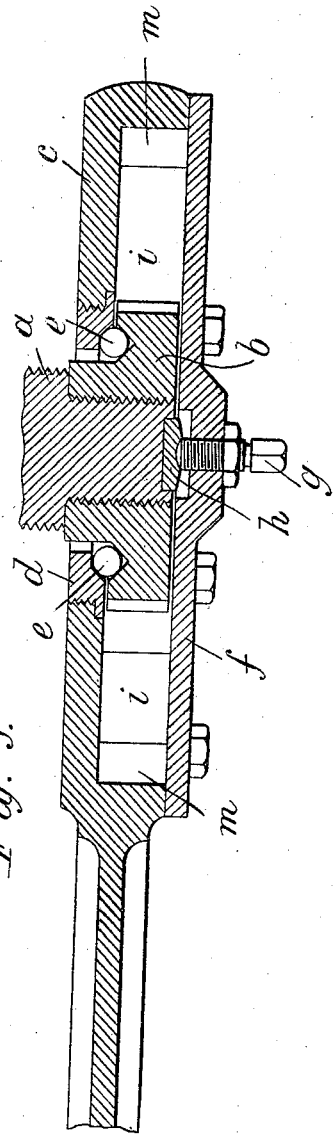

Figure 1 is a side elevation of a bicycle having my improved driving-gear applied thereto. Fig. 2 is a side elevation, on a larger scale, of the boss end of one of the pedal cranks or levers; and Fig. 3 is a horizontal section of Fig. 2, the cover-plate being here shown in position.

The driving-gear is arranged in duplicate and alike on either side of the bicycle.

$a$ is the crank axle or shaft from which the driving-wheel is rotated by a chain and sprocket-wheels, as shown in Fig. 1, or by other suitable and recognized means. Each end of the crank-shaft $a$ is threaded right and left hand, respectively, and ratchet-wheels $b$ are screwed thereon. The boss $c$ of the pedal-crank has a circular aperture which is entered by the ratchet-wheel $b$, and into this aperture on the inner face of the boss is screwed the hardened-steel ball-ring $d$, which, in conjunction with the annular groove in the inner side of the ratchet-wheel $b$ and the balls $e$, provides a ball-bearing upon which the crank oscillates. On the outer face of the crank-boss is secured a cover-plate $f$, Fig. 3, through which is passed a set-screw $g$, whereof the end engages a recess or depression in a hardened-steel disk $h$, let into the end of the crank-axle $a$. This forms an outer pivot-bearing for the crank and prevents side motion thereof on the ball-bearing above described. Wear may also be taken up by means of said set-screw. On either side of the aforesaid opening in the crank-boss recesses are provided, within which slide the pawl-blocks $i$, having ratchet-teeth adapted to engage the teeth of the ratchet-wheel $b$ and kept in constant contact therewith by the springs $l$.

$m\ m$ are key-plates which take the pressure of the pawl-blocks $i$ when in action. When the crank is depressed or turned in the direction of the arrow, Fig. 2, the pawl-blocks $i$ take into the teeth of the ratchet-wheel and rotate the latter and the crank-axle, thereby driving the bicycle, while when the crank is raised the said pawl-blocks merely ride over the teeth of the ratchet-wheel without rotating the latter. The bicycle may thus be continuously propelled by alternate downstrokes of the cranks. If the cranks are held stationary while the machine is running, the teeth of the pawl-blocks $i$ ride over the revolving ratchets $b$, thus giving the advantages of free wheeling.

In order to raise the cranks from their lowest to their highest position, I connect the ends thereof by a flexible cord or chain $n$, which passes over a roller $o$, carried by a clip-bracket $p$, secured to the down-tube $q$ of the frame. Springs for raising the cranks are thus avoided. The crank-stroke is limited by a stop-plate $r$, secured to the down-tube by a clip $s$. The ends $t$ of the pedal-pins project on the inner sides of the cranks and engage this stop-plate when sufficiently raised. The saddle-post is preferably about vertical, as illustrated, so as to bring the rider's body more above the pedals and distribute the weight thereof more equally between the two wheels.

In conclusion, I would observe that I do not confine or limit myself to the precise constructional details described with reference to and illustrated in the drawings, which can obviously be varied without in any way departing from my invention as set forth.

What I claim, and desire to secure by Letters Patent of the United States, is—

In combination with the crank-axle, a crank thereon having an opening, a ring $d$ screwed in said opening, a clutch-disk $b$, ball-bearings between the ring $d$ and the clutch-disk, said clutch-disk being arranged within the crank, a connection between the crank and the clutch-disk, and a screw $g$ passing through the crank and exerting pressure centrally upon the end of the crank-shaft, substantially as described.

In testimony whereof I affix my signature in presence of two witnesses.

RUDOLPH KOSCH.

Witnesses:
 TÖRÖK BÁLINTZ,
 PAUL KOSCH.